United States Patent
Saito et al.

[11] Patent Number: 5,405,899
[45] Date of Patent: Apr. 11, 1995

[54] RADIAL TIRE

[75] Inventors: Yuichi Saito; Susumu Watanuma, both of Kobe; Naohiko Kikuchi, Nishinomiya; Hiroyuki Noma, Kobe, all of Japan

[73] Assignee: Sumitomo Rubber Industries, Ltd., Kobe, Japan

[21] Appl. No.: 653,516

[22] Filed: Feb. 11, 1991

[30] Foreign Application Priority Data

Feb. 17, 1990 [JP] Japan .................................. 2-36754

[51] Int. Cl.⁶ .............................................. C08K 3/04
[52] U.S. Cl. .................................... 524/495; 524/474; 524/496; 524/571; 524/573; 524/575
[58] Field of Search ............... 524/474, 495, 496, 571, 524/573, 576

[56] References Cited

U.S. PATENT DOCUMENTS

| | | | |
|---|---|---|---|
| 4,485,285 | 11/1984 | Fujimaki et al. | 524/526 |
| 4,640,952 | 2/1987 | Takiguchi et al. | 524/296 |
| 4,745,150 | 5/1988 | Ida et al. | 524/505 |

FOREIGN PATENT DOCUMENTS

| | | |
|---|---|---|
| 0161793 | 11/1985 | European Pat. Off. . |
| 0171935 | 2/1986 | European Pat. Off. . |
| 0234303 | 9/1987 | European Pat. Off. . |
| 0263885 | 4/1988 | European Pat. Off. . |
| 0430617 | 6/1991 | European Pat. Off. . |

*Primary Examiner*—Paul R. Michl
*Assistant Examiner*—Edward Cain

[57] ABSTRACT

The present invention provides an optimum radial tire which is suitable for each car. In the present invention, an $\alpha$ value is introduced as indicating the properties of the car and the tread rubber of the tire is selected according to the $\alpha$ value. Accordingly, the present invention provides a radial tire which comprises a tread and sidewall, wherein the tread has the claimed relation between a viscoelasticity (tan $\delta$) peak temperature (Tp) and an $\alpha$ value which indicates the properties of a car, and a one side half width (w/2) of 25° C. or less, the one side half width (W/2) being defined with respect to a viscoelasticity distribution curve as the distance along the ½ peak tan $\delta$ viscoelasticity line from the perpendicular line representing (Tp) to the intersection with the viscoelasticity distribution curve to the right of the perpendicular line.

1 Claim, 1 Drawing Sheet

RADIAL TIRE

FIELD OF THE INVENTION

The present invention relates to a radial tire for passenger cars. Particularly, it relates to a radial tire which employs a tread rubber suitable for the properties of a pre-determined passenger car or light truck.

BACKGROUND OF THE INVENTION

Passenger cars now have very high performance, because many improvements have been made to engines and other mechanical or electrical elements of the cars. For example, the power output of engines is enhanced and body weight is reduced. Also, starting, accelerating and cornering properties are significantly improved.

As the properties of the cars, the power output of the engine, which indicates the horsepower of the car, and body weight are important, but the way how they are characterized or classified is different by each motor-manufacturing company. It is also important in view of safety that the tire which is suitable for the car are selected according to the performance of the car, whereby the performance of the car can be adequately drawn out.

However, in the development of the tires, especially in the development of the tread rubber which greatly contributes to the properties of the tires, it has not been considered to satisfy the performance of the car, excepting the tire for very special cars. Actually, in order to balance grip properties, comfortability to ride in, wearing resistance and the like, some rubbers are mixed to find a compromise point at the sacrifice of the properties of each rubber.

SUMMARY OF THE INVENTION

The present invention provides a radial tire which is suitable for each particular passenger car or light truck. In the present invention, an $\alpha$ value is introduced as indicating the properties of a specific passenger car or light truck and the tread rubber of the tire is selected according to the $\alpha$ value. Accordingly, the present invention provides a radial tire which comprises a tread and sidewall, wherein the tread has the following relation between a viscoelasticity (tan $\delta$) peak temperature (Tp) and an $\alpha$ value which indicates the properties of a particular passenger car or light truck, and a one side half width (w/2) of 25 deg. C. or less, the one side half width (W/2) being defined with respect to a viscoelasticity distribution curve as the distance along the $\frac{1}{2}$ peak tan $\delta$ viscoelasticity line from the perpendicular line representing (Tp) to the intersection with the viscoelasticity distribution curve to the right of the perpendicular line;

when $0 \leq \alpha \leq 1$ $Tp \leq 16.2\alpha - 34.2$ $Tp \geq \frac{\sqrt{128^2 - 36^2(\alpha - 3.5)}}{1.825} - 83$ when $1 \leq \alpha \leq 2$ $Tp \leq \frac{\sqrt{217^2 - 36^2(\alpha - 4.82)^2}}{1.825} - 110$ -continued $Tp \geq \frac{\sqrt{196.5^2 - 36^2(\alpha - 4.82)^2}}{1.825} - 110$ when $2 \leq \alpha \leq 4.22$ $Tp \leq \frac{\sqrt{141.7^2 - 36^2(\alpha - 3)^2}}{1.825} - 80$ $Tp \geq \frac{\sqrt{85^2 - 36^2(\alpha - 3)^2}}{1.825} - 60$ when $4.22 \leq \alpha$ $Tp \leq -2.4$ $Tp \geq -13.4$ wherein Tp is obtained from a viscoelasticity (tan $\delta$) temperature distribution curve which is determined using a viscoelastic spectrometer at a frequency of 10 Hz, an initial strain of 10%, an amplitude of $\pm 0.25\%$ and a temperature elevating rate of 2° C./min, and $\alpha$ is obtained from an equation represented by $$\frac{\text{Engine output} \times 10}{\text{Body weight} + 60}$$

wherein Engine output is a net value in ps unit and body weight is a weight of an empty car or light truck in Kg. (1 ps=0.9863 horsepower)

DETAILED DESCRIPTION OF THE INVENTION

Figure 1:
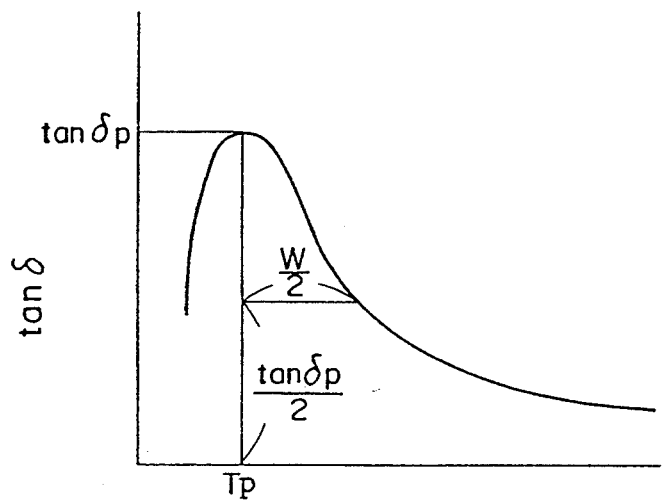
FIG. 1 shows an example of a viscoelasticity temperature distribution curve for explaining the viscoelasticity (tan $\delta$) peak temperature and the one side half width as defined hereinabove.

According to the present invention, an $\alpha$ value is introduced as an index of the properties of the car. Every car therefore is classified by the $\alpha$ value. A car or light truck which has a high $\alpha$ value is a sports car having a high power and a light body, and a car which has a low $\alpha$ value is a vehicle having a heavier body in comparison with horse power, such as an estate car or a light truck.

The viscoelasticity temperature distribution curve of a tire tread rubber compound may be obtained using a viscoelastic spectrometer (available from Iwamoto Manufacturing Co., Ltd). The test is carried out at a frequency of 10 Hz, an initial strain of 10%, an amplitude of $\pm 0.25\%$ and a rate of increasing temperature of 2° C./min. FIG. 1 shows an example of a general viscoelasticity temperature distribution curve determined at the above conditions. In FIG. 1, the abscissa shows temperature and the ordinate shows viscoelasticity (tan $\delta$). The viscoelasticity peak temperature is indicated by Tp. The one side half width which is indicated as W/2 is the value for the distance between two points where the line $\frac{1}{2}$ peak viscoelasticity (tan $\delta$p) is crossed with both the perpendicular line at Tp and the plotted curve.

In the present invention, Tp should satisfy the above mentioned relation according to the $\alpha$ value. If Tp is more than the above range, the grip properties of the tire will be good, but controlling ability over grip limit, comfortability to ride on and wear resistance will be deteriorated. If Tp is less than the above range, the grip properties of the tire will be poor, so that it is difficult that the horse power of the passenger car or light truck is properly transmitted to the road surface.

Radial tires are generally composed of a tread and a sidewall, but in the present invention the tread has certain specified properties. The tread also may have a one side half width (W/2) of 25 deg. C. or less as defined hereinabove. If it is more than 25 deg. C., the tire barely exhibits its properties even if the tread satisfies the claimed Tp range and α value. The properties of the car even may be adversely sacrificed.

The tread is generally prepared from a rubber composition which comprises a rubber component, a reinforcing material and a vulcanizing agent. A method for producing the tread of the present invention is known to persons skilled in the art, but the adjustment of the physical properties as mentioned above is generally conducted by selecting rubber components, crosslinking agents, amounts of the crosslinking agents, a vulcanizing time and the like.

The rubber component suitable for the tread of the present invention includes stirene butadiene rubber, high vinyl butadiene rubber, 3,4-isoprene rubber, isoprene butadiene rubber and the like. It is preferred that the rubber composition contains from 60 to 100% by weight of a solution-polymerized stirene butadiene rubber which has a styrene content of 15 to 45% by weight and a vinyl content in the butadiene portion of 10 to 75% by weight.

The reinforcing material of the rubber composition is one which is used for tire treads, for example carbon black. The carbon black preferably has a particle size of 15 to 35 micrometer. Particle sizes of less than 15 micrometer increase exothermic heat and rolling resistance and those of more than 35 micrometer deteriorate wear resistance and grip properties. The vulcanizing agent is generally sulfur, but others (e.g. organic peroxides) may be used.

The rubber composition may contain additives, such as wax, oil, antioxidant, filler, vulcanization accelerator and the like.

EXAMPLES

The present invention is illustrated by the following Examples which, however, are not to be construed as limiting the invention to their details.

Example 1

Stirene butadiene rubber (SBR) having the characteristics as shown in Table 1 was employed and a rubber composition was prepared from charge A, B or C as shown in Table 2. A tread rubber was prepared from the rubber composition and then formed into a tire. Table 3 shows car type employed for tests, its α value and tire size. The Tp value of and the one side half width of the tread rubber are shown in Table 4. Grip properties, controlling properties and comfortability to ride in were evaluated at Sumitomo Rubber Test Course in Okayama-ken, Japan and the results are shown in Table 4.

Grip properties
  Adhesion in lane change and limit of lateral adhesion during cornering.
Controlling properties
  Stability in adhesion limit in cornering and behavior in power on/off during cornering.
Comfortability to ride in
  Ride comfort on rough and uneven road and harshness level.
Subjective Rating
  5 Excellent
  4 Better
  3.5 Slightly better
  3 Control
  2.5 Slightly worse
  2 Worse
  1 Very bad

TABLE 1

|  | Styrene content (% by weight) | Vinyl content in butadiene portion (% by weight) | Oil extending amount (parts by weight) | Polymerizing method |
| --- | --- | --- | --- | --- |
| SBR (I) | 40 | 50 | 37.5 | Solution polymerization |
| SBR (II) | 32 | 52 | 37.5 | Solution polymerization |
| SBR (III)*1 | 35 | 18 | 37.5 | Emulsion polymerization |
| SBR (IV) | 40 | 40 | 37.5 | Solution polymerization |
| SBR (V) | 35 | 33 | 37.5 | Solution polymerization |
| SBR (VI) | 40 | 25 | 37.5 | Solution polymerization |
| SBR (VII)*2 | 45 | 18 | 37.5 | Emulsion polymerization |
| SBR (VIII) | 30 | 40 | 37.5 | Solution polymerization |
| SBR (IX)*3 | 23.5 | 18 | 37.5 | Emulsion polymerization |
| SBR (X) | 29 | 39 | 37.5 | Solution polymerization |
| SBR (XI) | 17 | 35 | 37.5 | Solution polymerization |
| SBR (XII) | 25 | 13 | 37.5 | Solution polymerization |
| SBR (XIII) | 10 | 13 | 37.5 | Solution polymerization |

*1: NIPOL 9520 from Nippon Zeon Co, Ltd.
*2: NIPOL 9521 from Nippon Zeon Co., Ltd.
*3: SBR 1721 from Sumitomo Chemical Co., Ltd.

TABLE 2

|  | A | B | C |
| --- | --- | --- | --- |
| Oil extended SBR | 137.5 | 137.5 | 68.75 |
| Natural rubber (RSS#3) | — | — | 50 |
| Carbon Black | 90 | 90 | 90 |
| Aroma oil | 20.5 | 16.5 | 26.25 |
| Wax | 2 | 2 | 2 |
| Antioxidant[1] | 2 | 2 | 2 |
| Stearic acid | 2 | 2 | 2 |
| Zinc oxide | 3 | 3 | 3 |
| Sulfur | 1.75 | 1.75 | 1.75 |
| Vulcanization accelerator[2] | 1 | 1 | 1 |

Unit: parts by weight
[1]N,N'-phynyl-p-phenylenediamine
[2]N-cyclohexyl-2-benzothiazyl sulfonamide

TABLE 3

|  | α value | Engine output (ps) | Body weight (Kg) | Tire size |
| --- | --- | --- | --- | --- |
| A French sports car | 2.76 | 450 | 1,570 | F) 235/45 ZR17  R) 255/40 ZR17 |
| B French sports car | 1.95 | 320 | 1,580 | F) 225/50 ZR16  R) 245/45 ZR16 |

TABLE 3-continued

| | | α value | Engine output (ps) | Body weight (Kg) | Tire size |
|---|---|---|---|---|---|
| C | Japanese sports car | 1.54 | 230 | 1,430 | 225/50 ZR17 |
| D | Japanese passenger car | 1.10 | 120 | 1,030 | 185/60 R14 |
| E | Japanese passenger car | 0.82 | 73 | 830 | 165/70 R13 |
| F | Japanese wagon | 0.54 | 85 | 1,500 | 215 SR15 |

TABLE 4

| | Comparative Examples | | | | | | | | | Examples | | | | | | | |
|---|---|---|---|---|---|---|---|---|---|---|---|---|---|---|---|---|---|
| | 1 | 2 | 3 | 4 | 5 | 6 | 7 | 8 | 9 | 1 | 2 | 3 | 4 | 5 | 6 | 7 | 8 |
| Car type and tire | A | A | B | B | C | C | D | E | F | A | B | C | D | E | E | F | F |
| α value | 2.76 | 2.76 | 1.95 | 1.95 | 1.54 | 1.54 | 1.10 | 0.82 | 0.54 | 2.76 | 1.95 | 1.54 | 1.10 | 0.82 | 0.82 | 0.54 | 0.54 |
| SBR in Table 1 | (I) | (III) | (IV) | *1 | *2 | (IX) | (IX) | *2 | (XIII) | (II) | (V) | (VIII) | (X) | ← | (XI) | ← | (VII) |
| Charge No. | A | B | A | B | B | B | C | B | B | B | B | B | B | B | B | B | B |
| Tan δ peak temperature (°C.) | +2 | −18 | −2 | −14 | −16 | −30 | −35 | −16 | −60 | −10 | −14 | −16 | −22 | −22 | −30 | −30 | −42 |
| One side half width W/2 (deg) | 20 | 22 | 17 | 35 | 44 | 20 | 26 | 44 | 26 | 22 | 16 | 17 | 21 | 21 | 21 | 21 | 24 |
| Tire properties Dry roads | | | | | | | | | | | | | | | | | |
| Grip | 4 | 3 | 3.5 | 3 | 3 | 3 | 3 | 3 | 3 | 3.5 | 3.5 | 4 | 4 | 3 | 3 | 4 | 3.5 |
| Control | 1 | 3 | 2 | 3 | 3 | 3 | 3 | 3 | 3 | 4 | 3 | 3.5 | 4 | 3.5 | 4 | 3.5 | 3 |
| wet roads | | | | | | | | | | | | | | | | | |
| Grip | 2 | 3 | 2.5 | 3 | 2.5 | 3 | 3 | 3 | 3 | 4 | 3.5 | 4 | 3.5 | 3 | 3.5 | 4 | 3.5 |
| Control | 1 | 3 | 2 | 3 | 3 | 3 | 3 | 3 | 3 | 3.5 | 3 | 3.5 | 3.5 | 3.5 | 4 | 3 | 3.5 |
| Comfortability to ride in | 1 | 3 | 2.5 | 3 | 3 | 3 | 3 | 4 | 3 | 3 | 3.5 | 3 | 3.5 | 3.5 | 3.5 | 3 | 3.5 |

What is claimed is:

1. A method of making a radial tire having a tread and a side wall, comprising
   determining the engine output and body weight of a passenger car or light truck, wherein engine output is a net value in ps unit and body weight is a weight of an empty passenger car or light truck in Kg,
   determining an α value for said passenger car or light truck on which the tire is to be mounted using the equation $$\frac{\text{Engine output} \times 10}{\text{Body weight} + 60},$$

determining the Tp value for said tread according to the following relation between a viscoelasticity (tan δ) peak temperature (Tp) and said α value, and a one side half width (W/2) of 25° C. or less, said one side half width (W/2) being defined with respect to a viscoelasticity distribution curve as the distance along the ½ peak tan δ viscoelasticity line from the perpendicular line representing (Tp) to the intersection with the viscoelasticity distribution curve to the right of the perpendicular line;

when $0 \leq \alpha \leq 1$ $$Tp \leq 16.2\alpha - 34.2$$

$$Tp \geq \frac{\sqrt{128^2 - 36^2(\alpha - 3.5)^2}}{1.825} - 83$$

when $1 \leq \alpha \leq 2$ $$Tp \leq \frac{\sqrt{217^2 - 36^2(\alpha - 4.32)^2}}{1.825} - 110$$

$$Tp \geq \frac{\sqrt{196.5^2 - 36^2(\alpha - 4.82)^2}}{1.825} - 110$$

when $2 \leq \alpha \leq 4.22$ $$Tp \leq \frac{\sqrt{141.7^2 - 36^2(\alpha - 3)^2}}{1.825} - 80$$

$$Tp \geq \frac{\sqrt{85^2 - 36^2(\alpha - 3)^2}}{1.825} - 60$$

when $4.22 \leq \alpha$ $$Tp \leq -2.4$$

$$Tp \geq -13.4$$

wherein Tp is obtained from a viscoelasticity (tan δ) temperature distribution curve which is determined using a viscoelastic spectrometer at a frequency of 10 Hz, an initial strain of 10%, an amplitude of ±0.25% and a temperature elevating rate of 2° C./min, and
using the determined Tp in selecting the components to make said tread.

* * * * *